US012325206B2

(12) United States Patent
Fleury

(10) Patent No.: US 12,325,206 B2
(45) Date of Patent: Jun. 10, 2025

(54) UNIT FOR FORMING A PLATE ELEMENT FOR MANUFACTURING FOLDING BOXES

(71) Applicant: BOBST LYON, Villeurbanne (FR)

(72) Inventor: Phillippe Fleury, Saint Jean des Vignes (FR)

(73) Assignee: BOBST LYON, Bron (FR)

( * ) Notice: Subject to any disclaimer, the term of this patent is extended or adjusted under 35 U.S.C. 154(b) by 73 days.

(21) Appl. No.: 17/593,008

(22) PCT Filed: Mar. 6, 2020

(86) PCT No.: PCT/EP2020/025114
§ 371 (c)(1),
(2) Date: Sep. 3, 2021

(87) PCT Pub. No.: WO2020/182347
PCT Pub. Date: Sep. 17, 2020

(65) Prior Publication Data

US 2022/0176669 A1 Jun. 9, 2022

(30) Foreign Application Priority Data

Mar. 8, 2019 (FR) ...................................... 1902391

(51) Int. Cl.
*B31B 50/14* (2017.01)
*B31B 50/22* (2017.01)
(Continued)

(52) U.S. Cl.
CPC ............ *B31B 50/146* (2017.08); *B31B 50/22* (2017.08); *B31B 50/256* (2017.08); *B31B 2120/302* (2017.08); *B31B 2120/70* (2017.08)

(58) Field of Classification Search
CPC ..... B31B 50/146; B31B 50/22; B31B 50/256; B31B 2120/302; B31B 2120/70;
(Continued)

(56) References Cited

U.S. PATENT DOCUMENTS 3,199,495 A * 8/1965 Peras ...................... F02B 53/00
418/61.3
3,916,186 A * 10/1975 Raser ...................... G01D 5/36
250/237 R
(Continued)

FOREIGN PATENT DOCUMENTS

| | | | |
|---|---|---|---|
| EP | 2228206 | A1 | 9/2010 |
| JP | 2002067190 | A | 3/2002 |
| WO | 2013029768 | A1 | 3/2013 |

OTHER PUBLICATIONS

International Search Report issued May 4, 2020 in PCT/EP2020/025114 (2 pages).

*Primary Examiner* — Sameh Tawfik
(74) *Attorney, Agent, or Firm* — Bookoff McAndrews PLLC

(57) ABSTRACT

A unit for forming a plate element for the continuous flow manufacturing of folding boxes from plate elements, the plate elements being successively inserted into the unit and moving in a feed direction, comprising pairs of rotary cylindrical shafts, carrying forming tooling, which forms the plate elements using slitting, creasing and cutting operations, comprising a cutting unit, and pairs of rotary cylindrical shafts.

7 Claims, 3 Drawing Sheets

(51) Int. Cl.
*B31B 50/25* (2017.01)
*B31B 120/30* (2017.01)
*B31B 120/70* (2017.01)

(58) Field of Classification Search
CPC ..... B31B 50/005; B31B 50/006; B31B 50/92; B31B 50/26
USPC .......................................................... 493/60
See application file for complete search history.

(56) References Cited

U.S. PATENT DOCUMENTS

| | | | | |
|---|---|---|---|---|
| 3,985,476 | A * | 10/1976 | Hofbauer | F02B 53/06 418/61.3 |
| 4,860,704 | A * | 8/1989 | Slaughter | F02N 9/04 123/237 |
| 5,158,522 | A * | 10/1992 | Cummings | B26D 1/20 493/182 |
| 6,478,725 | B1 * | 11/2002 | Bengt | B65H 5/224 493/63 |
| 8,579,777 | B2 * | 11/2013 | Hatano | B31B 50/00 493/182 |
| 10,287,931 | B2 * | 5/2019 | Kim | H02K 7/116 |
| 10,800,061 | B2 * | 10/2020 | Yamamuro | B26D 1/285 |
| 11,866,187 | B1 * | 1/2024 | Lin | H02J 50/001 |
| 2011/0092351 | A1 * | 4/2011 | Hatano | B31B 50/00 493/162 |
| 2014/0324293 | A1 * | 10/2014 | Jang | G01L 25/003 701/41 |
| 2015/0042256 | A1 * | 2/2015 | Kawasaki | G05B 19/19 318/567 |
| 2022/0176669 | A1 * | 6/2022 | Fleury | B31B 50/20 |

* cited by examiner

UNIT FOR FORMING A PLATE ELEMENT FOR MANUFACTURING FOLDING BOXES

CROSS-REFERENCE TO RELATED APPLICATION(S)

This application is a National Stage under 35 U.S.C. § 371 of International Application No. PCT/EP2020/025114, filed Mar. 6, 2020, which claims priority to French Patent Application No. 1902391, filed Mar. 8, 2019, the contents of all of which are incorporated by reference in their entirety.

This invention relates generally to the field of packaging. More particularly, the invention relates to a unit for forming a plate element for the manufacture of folding boxes from plate elements, for example, of corrugated board.

In the packaging industry, cardboard crates, or boxes are commonly made from plate elements in the form of sheets of cardboard or corrugated cardboard. The plate elements are processed in a continuous flow along a package manufacturing line where they are printed, cut and creased, folded and assembled by gluing, to form the boxes.

PRIOR ART

With reference to FIG. 1, in a known type of package manufacturing line, the plate elements 1 are fed into the production line in a so-called "transverse" arrangement and are driven continuously in feed direction DA. Plate element 1 is processed successively by a printing unit, a unit for forming a plate element, here a so-called "slotter" unit, and a folding-gluing unit. The printing unit provides printing, typically by flexography, on plate element 1. Printed plate element $\mathbf{1}_a$ is then processed by the unit for forming a plate element which essentially slits 10 and creases 11 for fold lines, to create the sides of the box 12 and the flaps of the box 13. The cut plate element $\mathbf{1}_b$, supplied by the unit for forming a plate element is then folded and glued in the folding-gluing unit to obtain a package $\mathbf{1}_c$ in the form of a folding box. A counting-rejecting unit receives the folding boxes $\mathbf{1}_c$ and forms a stack of folding boxes $\mathbf{1}_d$ which is then bundled. The $\mathbf{1}_e$ bundled stack then goes to a palletizer at the end of the package manufacturing line.

In the prior art, the package manufacturing line as described above, and the integration of a unit for forming a plate element of the type described in document WO 2013/029768 make it possible to achieve the high-speed manufacture of folding boxes, of up to approximately 20,000 boxes/hour. This unit for forming a plate element has four pairs of rotating cylindrical shafts which are arranged transversely to the feed direction of the plate elements. The cylindrical shafts rotate at high speed and perform the various processing operations on the plate elements. The majority of cuts are made in the feed direction of the plate elements in the unit. The shapes and dimensions of the slits are determined by the cutting tools, mounted on the cylindrical tool-holding shafts, which provide rotary cutting. The movement of the plates is continuous between the cylindrical tool-holding shafts and the cylindrical counter-tool shafts. The cylindrical counter-tool shafts are arranged in parallel and opposite the cylindrical tool-holding shafts, to work with the latter. Rotary cutting tools have laterally spaced blades arranged to create slits at and from the front and rear edges (see items 14 and 15 in FIG. 1) of the plate element. In addition to the rotary die cutters, the unit for forming a plate element also has laterally spaced rotary creasing tools arranged to create the folding lines on the plate element. A control unit controls the rotational drive motors of the cylindrical shafts, so as to process a plate element, the tools are in contact with corresponding predetermined regions of the plate element and are driven by a processing speed whose tangential component is equal to the drive speed of the plate element. The drive speed of the plate element is substantially constant between the inlet and the outlet of the unit for forming a plate element.

In the unit for forming a plate element, a lateral gluing tab 16 (FIG. 1) is also cut from the plate element, as an extension of the sides of the box 12 (FIG. 1). After folding, this tab is glued to the opposite side of the box, in order to form the folding box $\mathbf{1}_c$ (FIG. 1). For the production of the lateral gluing tab, specific tooling is provided in the unit for forming a plate element, arranged so as to make two transverse cuts, or at an angle, with respect to the feed direction of the plate element, as well as a first slit from the trailing edge and a second slit from the leading edge.

The arrangement of several layers in a single plate element is a solution that allows a substantial increase in production of folding boxes in a package manufacturing line having a certain plate processing rate. Thus, the possibility of processing a plate element in order to create two layers, while keeping the same machine pitch, would make it possible to double the production rate of folding boxes in a package manufacturing line of the type described above.

Document EP2228206 describes a package manufacturing line comprising a forming unit having a plurality of rotating shafts, on which forming tools are arranged. In particular, each forming shaft comprises several forming tools. This allows each forming cylinder to make several spatially separated cuts on a sheet of cardboard. This device presents a complexity when it comes to changing the format of the folding boxes and requires the operator of the package machine to change the positions of the cutting elements (knife blades) on the rotating shafts.

PRESENTATION OF THE INVENTION

It is desirable to provide a unit for forming a plate element of the aforementioned type of the rotating cylindrical shaft pairs, which is capable of producing formed plate elements with two layers, to allow an increase in the production rate of folding boxes to about 40,000 boxes/hour.

According to a first aspect, the invention relates to a unit for forming a plate element for the continuous production of folding boxes from plate elements, the plate elements being inserted successively into the forming unit and moving in the feed direction, comprising pairs of rotating cylindrical shafts, carrying a forming tool, which forms the plate elements by slitting, creasing, and cutting operations, characterized in that it comprises a cutting unit, and wherein the pairs of rotating cylindrical shafts and the cutting unit work together to produce, in the formed plate element, the first and second juxtaposed folding box layers, and wherein two pairs of shafts working together provide central slits in each plate element aligned on a central transverse axis of the plate element, and two pairs of shafts working together to respectively create rear edge slits on a rear layer and front edge slits on a front layer, and wherein each of said shafts carry a single slitting tool, and wherein the angular position of at least one of the slitting shafts is adjustable relative to the feed position in the feed direction of the plate element.

The fact that each slitting shaft carries a single slitting tool and that the angular position is adjustable means that the sizes of the folding boxes may be changed. Preferably, the angular position of all slitting shafts is adjustable.

The angular position of the cylinder may be defined as the position of a (predefined) reference point on the circumference of the slitting cylinder in relation to the drive surface upon which the plate elements are transported. This angle is measured between the reference point on the slitting cylinder, the axis of the slitting cylinder and the driving surface of the plate. The angular position may be adjusted by rotating the cylinder with the remaining tools stationary on the cylinder. This rotation can be accomplished automatically by a position variator. The feed position of the plate element may be defined by the current position of the first front edge of the plate element (the cardboard sheet) in the feed direction.

In one variant, the cutting unit comprises a perforation blade perpendicular to the feed direction, and which allows the first and second juxtaposed folding box layers to be serially associated and connected to each other by attachment points.

In one embodiment, the unit for forming a plate element comprises a pair of rotating cylindrical shafts arranged to perform cutting operations of a box flap on a rear layer and pre-creasing operations of fold lines in both layers.

In one embodiment, the unit for forming a plate element comprises a pair of rotating cylindrical shafts arranged to perform cutting operations of a box flap on a front layer, and pre-creasing operations of fold lines in both layers, and a pair of rotating cylindrical shafts arranged to perform crushing operations of the two layers.

In another variant, the unit for forming a plate element comprises the first and second unit for processing a plate element, serially associated, and having a same architecture with the pairs of rotating cylindrical shafts.

In another variant, the first and second unit for processing a plate elements each comprise four pairs of rotatable cylindrical shafts aligned and arranged transversely to the direction of feed, the first and second unit for processing a plate elements being associated to form an alignment of eight pairs of rotatable cylindrical shafts.

In another variant, the second and fourth pairs of rotating cylindrical shafts of the first unit for processing a plate element work together to form central slits in the processed plate element that are aligned with a central longitudinal axis of the processed plate element, the second pair of rotating cylindrical shafts comprising a cylindrical tool-holding shaft carrying a first slitting tool, arranged to provide the first central slit portions, and the fourth pair of rotating cylindrical shafts comprising a cylindrical tool-holding shaft carrying a second rotating tool, arranged to provide the second central slit portions, each central slit being formed by the combination of a first central slit portion and a second central slit portion and having a length determined by an overlap area between the first and second central slitting portions that is defined by angular position settings of the first and second rotary tools.

The shafts are preferably independent and for a chosen blade length, the system has no limitation on the portions to be cut, because of the shafts are independent (a single blade on each shaft), and due to the angular position of each shaft. This allows for an infinite number of overlap areas ranging from the minimum length of one blade to the maximum length of the sum of the 2 blades In another embodiment, the unit for forming a plate element comprises a first box tab cutting device mounted on the third pair of rotating cylindrical shafts in the first unit for processing a plate element, the box tab cutting device performing cutting operations on a first box tab on a proximal lateral edge of the processed plate element.

In another variant, the unit for forming a plate element comprises a pre-creasing device mounted on the third pair of rotating cylindrical shafts of the first unit for processing a plate element, the pre-creasing device performing pre-creasing operations on the processed plate element in order to produce fold lines in the first and second folding box layers.

In another variant, the second pair of rotating cylindrical shafts of the second unit for processing a plate element ($\mathbf{20}_2$) comprises a rotating cylindrical tool-holding shaft carrying a third slitting tool, arranged to make back edge slits in the processed plate element, and the fourth pair of rotating cylindrical shafts of the second unit for processing a plate element comprises a rotating cylindrical tool-holding shaft carrying a fourth slitting tool, arranged to make front edge slits in the processed plate element.

In another variant, the unit for forming a plate element comprises a first box tab cutting device mounted on the third pair of rotating cylindrical shafts of the first unit for processing a plate element, the box tab cutting device performing cutting operations on a second box tab on a proximal lateral edge of the processed plate element.

In another variant, the unit for forming a plate element comprises a first box tab cutting device mounted on the third pair of rotating cylindrical shafts of the second unit for processing a plate element, the final creasing device performing final creasing operations on the processed plate element to make the folding lines in the first and second folding box layers.

In another variant, the unit for processing a plate element comprises an edge cutter mounted on one of the first and second units for processing a plate element and arranged to perform an edge cutting operation on a distal lateral edge of the processed plate element, the first pair of rotating cylindrical shafts of the first unit for processing a plate element has means for feeding the processed plate element, and the first pair of rotating cylindrical shafts of the first unit for processing a plate element has means for feeding the processed plate element, and arranged to flatten the thickness of a proximal lateral strip and a distal lateral strip of the processed plate element.

In one variant, the cutting unit is a rotary cutter with rotating cylindrical shafts.

BRIEF DESCRIPTION OF THE DRAWINGS

Further advantages and characteristics of this invention will become more apparent from the following detailed description of one particular embodiment of the invention, with reference to the attached drawings, in which.

The longitudinal direction is defined with reference to the direction of movement or feed of the plate elements in the package manufacturing line, along their longitudinal centerline. The transverse direction is defined as the direction perpendicular in a horizontal plane to the scrolling direction of the plate elements. The upstream and downstream directions are defined with reference to the direction of movement of the plate elements, along the longitudinal direction throughout the package manufacturing line, from the line entrance to the line exit. The proximal and distal edges of the plate element are defined in this non-limiting example with respect to the conductive side and the opposite conductive side of the machine and the unit for processing a plate element as the plate element moves in the horizontal plane.

DETAILED DESCRIPTION OF PREFERRED EMBODIMENTS

With reference to FIGS. 2-5, a particular embodiment 2 of a unit for forming a plate element according to the invention, in the form of corrugated sheets, is now described by way of example.

Figure 3:
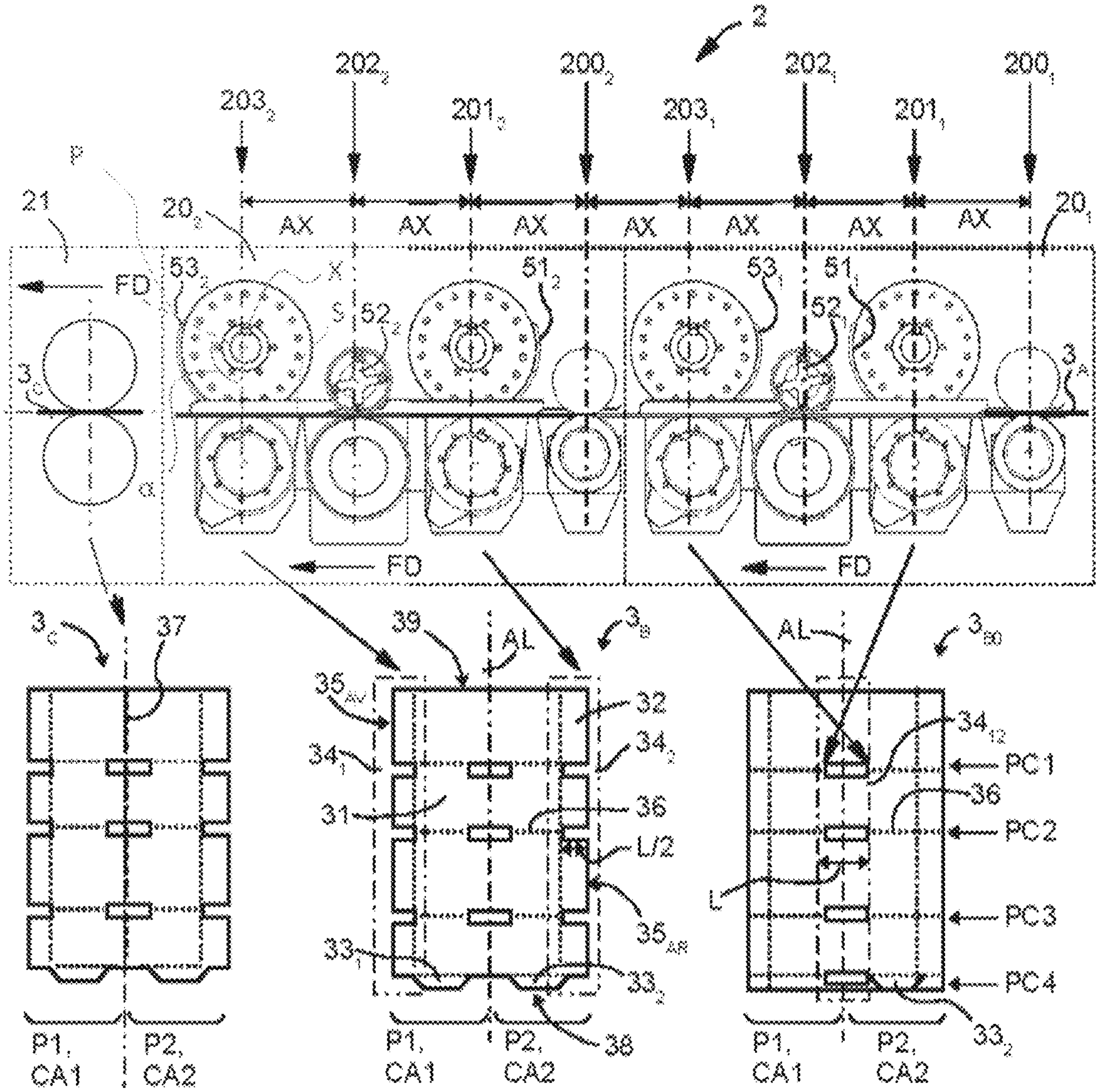
FIG. 3 is a diagram showing a general architecture of a unit for forming a plate element according to this invention.

The general architecture of the unit for forming a plate element 2 is visible in FIG. 3. In FIG. 3, the unit for forming a plate element 2 is shown associated with a cutting unit 21, the function of which will become clear in the following description.

Figure 1:
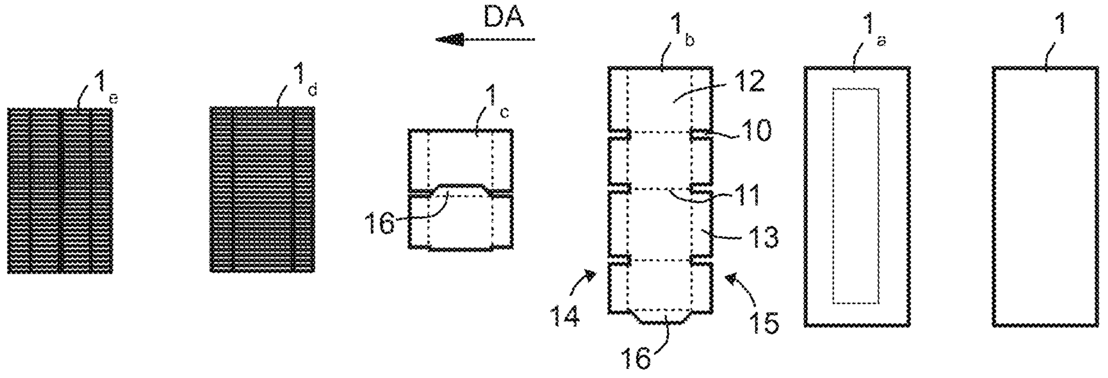
FIG. 1 is a diagram showing a process for the production of folding boxes of the prior art.
Figure 2:
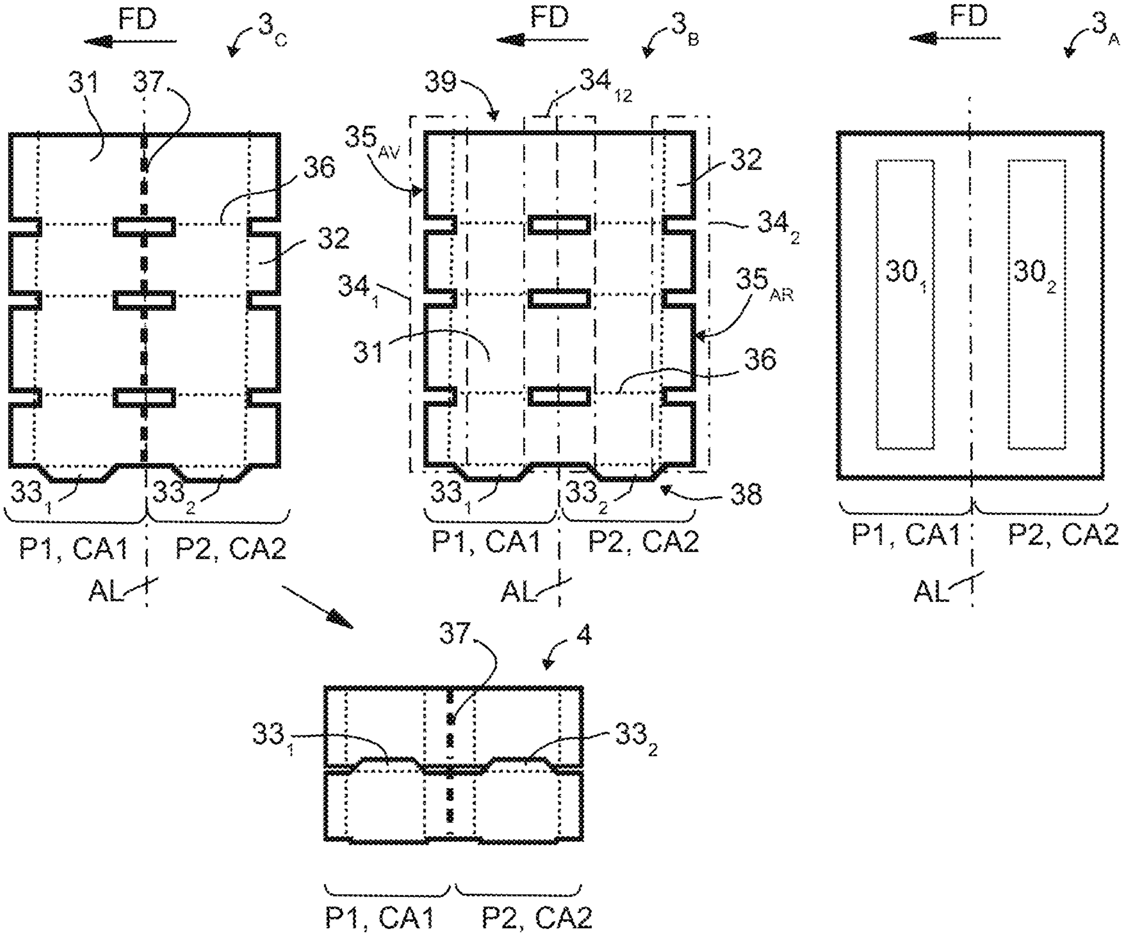
FIG. 2 is a diagram showing different states of processing a plate element in a process to manufacture folding box packaging using the unit according to this invention.

The plate elements, in their various processing states, are all referred to by the numeral 3 in FIGS. 2 and 3, with index letters A, B0, B and C associated with the numeral 3 indicating the processing state of the plate element under consideration.

The plate element 3 is shown in FIG. 2 in the different processing states explained above, with the labels $\mathbf{3}_A$, $\mathbf{3}_B$, and $\mathbf{3}_C$.

The direction of the plate elements 3 feed in the unit for forming a plate element 2, and in the package production line in which it is included, from upstream to downstream is indicated by arrow FD in FIGS. 2 and 3. The plate elements 3 are conveyed and processed in the unit for forming a plate element 2 in a transverse arrangement, i.e., with their longitudinal center axis AL being perpendicular to the feed direction FD.

The plate element $\mathbf{3}_A$, shown in FIG. 2, is typically formed from a rectangular plate, for example here from corrugated board, which is to be processed to form two folding boxes CA1 and CA2. The plate element $\mathbf{3}_A$, for example, is here a plate element that has been printed by a printing unit placed upstream of the unit for forming a plate element 2 in a package production line.

As visible in FIG. 2, the printed plate element $\mathbf{3}_A$ here has two printed areas $\mathbf{30}_1$ and $\mathbf{30}_2$, located on either side with respect to the longitudinal centerline AL of the plate element. The printed areas $\mathbf{30}_1$ and $\mathbf{30}_2$ belong respectively to two layers, P1 and P2, in the plate element. The two layers P1 and P2, correspond respectively to the folding boxes CA1 and CA2, to be made from the plate element, with the aid of the unit for forming a plate element 2. In the plate element, layers P1 and P2 are arranged transversely to the feed direction FD in a side-by-side relationship.

The unit for forming a plate element 2 receives the printed plate element $\mathbf{3}_A$ as input, processes it and outputs a formed plate element $\mathbf{3}_B$ in which processing operations have been carried out to obtain the two layers P1 and P2. The processing operations specifically comprise, slitting, cutting and slitting operations to form box sides 31, body flaps 32 and two box tabs $\mathbf{33}_1$ and $\mathbf{33}_2$ for layers P1 and P2 of the plate element.

The formed plate element $\mathbf{3}_B$ comprises center slits $\mathbf{34}_{12}$ and front edge slits $\mathbf{34}_1$ and rear edge slits $\mathbf{34}_2$. The central slits $\mathbf{34}_{12}$ are aligned along the longitudinal centerline AL and participate in forming the box sides 31 and box flaps 32 of layers P1 and P2. The front edge slits $\mathbf{34}_1$ are formed on a longitudinal front edge $\mathbf{35}_{AV}$ of the plate element and participate in the formation of the box sides 31 and box flaps 32 of layer P1. The rear edge slits $\mathbf{34}_2$ are formed on a longitudinal rear edge $\mathbf{35}_{AR}$ of the plate element and participate in the formation of the box sides 31 and box flaps 32 of layer P2. The box tabs $\mathbf{33}_1$ and $\mathbf{33}_2$ are formed on the proximal lateral edge 38 of the plate element.

The formed plate element $\mathbf{3}_B$ also has creasing 36 to form future fold lines, which are created by creasing operations in the unit for forming a plate element 2.

The plate element 3*C* is obtained after the processing operation performed by the cutting unit 21 on the plate element $\mathbf{3}_B$. The cutting unit 21 performs selective cuts to form attachment points 37. The plate element 3*C* thus has layers P1 and P2 which are now connected only by the attachment points 37.

The plate element $\mathbf{3}_C$ is then processed by a folding-gluing unit (not shown), which performs a folding operation and glues the box flaps $\mathbf{33}_1$ and $\mathbf{33}_2$ to corresponding box sides to obtain a folded assembly 4 formed by the two folding boxes CA1 and CA2 connected by the attachment points 37, the two folding boxes CA1 and CA2 corresponding to layers P1 and P2 respectively. The attachment points 37 are broken, later in the manufacturing process, to allow the folding boxes CA1 and CA2 to be separated.

The angular position of at least one of the slitting shafts $\mathbf{201}_1$, $\mathbf{203}_1$, $\mathbf{201}_2$, $\mathbf{203}_2$ is adjustable relative to the feed position in the feed direction (FD) of the plate element. The angular position $\alpha$ may be defined as the position of a reference point P (predefined) on the circumference of the slitting shaft $\mathbf{201}_1$, $\mathbf{203}_1$, $\mathbf{201}_2$, $\mathbf{203}_2$ in relation to the feed surface S upon which the plate elements 3 are transported. This angle $\alpha$ is measured between the reference point P on the slitting cylinder/shaft $\mathbf{201}_1$, $\mathbf{203}_1$, $\mathbf{201}_2$, the slitting cylinder axis X, and the plate feed surface S.

The general architecture and operation of the unit for forming a plate element 2 is now described in detail below with particular reference to FIG. 3.

The plate elements are successively inserted, one by one, into the unit for forming a plate element 2 for processing, with an insertion rate corresponding to a machine step upon which the various pieces of equipment of the package production line are synchronized, thus, various pieces of equipment make up unit 2.

In accordance with the invention, the unit for forming a plate element 2 is formed by the serial association of two units for processing a plate element $\mathbf{20}_1$ and $\mathbf{20}_2$, known as "slotter" units, having a same general architecture. The first unit $\mathbf{20}_1$ is traversed before the second unit for processing a plate element $\mathbf{20}_2$ by the plate element moving in the feed direction FD. Both units for processing a plate element $\mathbf{20}_1$ and $\mathbf{20}_2$ are of the type described in WO 2013/029768.

In the unit for forming a plate element 2, the performance of processing operations on the plate element is optimized, by distributing these processing operations judiciously between the two units for processing a plate element $\mathbf{20}_1$ and $\mathbf{20}_2$.

Here, the units for processing a plate element $\mathbf{20}_1$ and $\mathbf{20}_2$ each comprise four pairs of rotating cylindrical shafts. Thus, the unit for forming a plate element 2 formed by the combination of the plate element processing units $\mathbf{20}_1$ and $\mathbf{20}_2$ comprises eight pairs of rotary cylindrical shafts, labeled $\mathbf{200}_1$ to $\mathbf{203}_1$ for the first unit for processing a plate element $\mathbf{20}_1$ and $\mathbf{200}_2$ to $\mathbf{203}_2$ for the second unit $\mathbf{20}_2$. The eight pairs of rotating cylindrical shafts, $\mathbf{200}_1$ to $\mathbf{203}_1$ and $\mathbf{200}_2$ to $\mathbf{203}_2$, are spaced apart from each other by the same center distance AX. The length of the center distance AX typically corresponds to a minimum plate element size that may be processed in the unit for forming plate element 2.

The first unit for processing a plate element $\mathbf{20}_1$ processes the plate element $\mathbf{3}_A$ to produce a preformed plate element $\mathbf{3}_{B0}$ visible in FIG. 3. In the first unit $\mathbf{20}_1$, the first pair of rotating cylindrical shafts $\mathbf{200}_1$ is dedicated to feeding the plate element.

The preformed plate element $\mathbf{3}_{B0}$ comprises central slits $\mathbf{34}_{12}$ that have been cut by suitable tools $\mathbf{51}_1$ and $\mathbf{53}_1$ provided on the second and fourth pairs of rotating cylindrical shafts $\mathbf{201}_1$ and $\mathbf{203}_1$, respectively. The tools $\mathbf{51}_1$ and $\mathbf{53}_1$ are carried by rotating tool-holder shafts (upper cylindrical shafts) of the second and fourth pairs of rotating cylindrical shafts $\mathbf{201}_1$ and $\mathbf{203}_1$, respectively.

The tools $\mathbf{51}_1$ and $\mathbf{53}_1$ typically each comprise cutting blades that conform to the cylindrical shape of the rotating tool-holder shafts. In each rotary tool shaft, a plurality of cutting blades are transversely spaced and mounted in correspondence with central positions PC1 to PC4 defined in the plate element $\mathbf{3}_{B0}$, on the longitudinal centerline AL, at which the central slits $\mathbf{34}_{12}$ are to be made.

The tools $\mathbf{51}_1$ and $\mathbf{53}_1$ are arranged and mounted on their respective rotating tool-holder shafts in such a way that a length L of the center slits $\mathbf{34}_{12}$ in the plate element $\mathbf{3}_{B0}$ may be set, and thus configure unit 2 for different folding box formats. The length L of the center slits $\mathbf{34}_{12}$ is adjusted by changing the angular position ($\alpha$) of tools $\mathbf{51}_1$ and $\mathbf{53}_1$ on their respective rotating tool-holder shafts.

Figure 4:
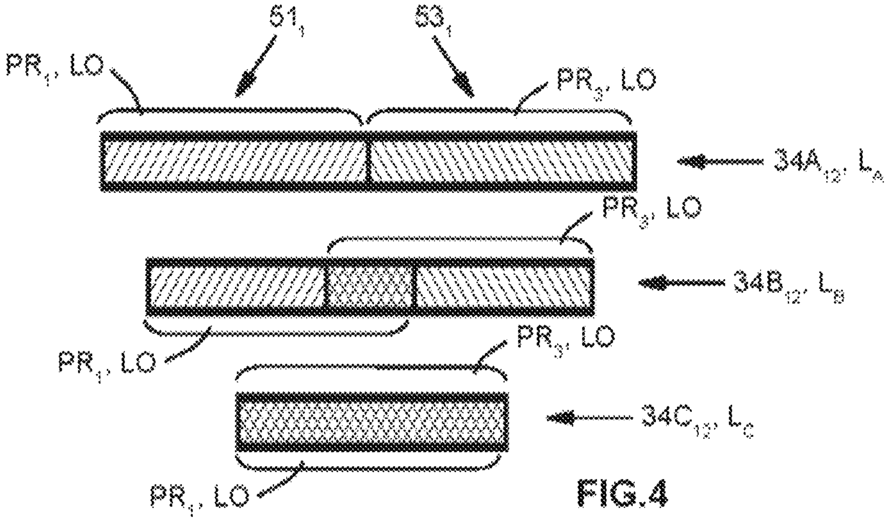
FIG. 4 is a diagram showing examples of center slits of different lengths that may be made in a plate element with the plate element forming unit of FIG. 3.

By way of example, shown in FIG. 4 are three central slits $\mathbf{34}A_{12}$, $\mathbf{34}B_{12}$, and $\mathbf{34}C_{12}$, having respective lengths $L_A$, $L_B$, and $L_C$, made by unit 2 with a single set of tools $\mathbf{51}_1$ and $\mathbf{53}_1$. These three central slits $\mathbf{34}A_{12}$, $\mathbf{34}B_{12}$ and $\mathbf{34}C_{12}$, are obtained with three distinct setting configurations respectively for tools $\mathbf{51}_1$ and $\mathbf{53}_1$ for different folding boxes.

The tools $\mathbf{51}_1$ and $\mathbf{53}_1$ are similar and respectively cut slit portions $PR_1$ and $PR_3$, having the same length LO. As an example, the length LO is considered here equal to 150 mm. The tools $\mathbf{51}_1$ and $\mathbf{53}_1$ may also have a different development.

The central slit $\mathbf{34}A_{12}$ of length $L_A$ is the maximum length slit that is achievable with tools $\mathbf{51}_1$ and $\mathbf{53}_1$. In this first setup configuration, tools $\mathbf{51}_1$ and $\mathbf{53}_1$ are mounted on their respective rotating tool-holder shafts at the first angular positions that make it possible to obtain the center slit $\mathbf{34}A_{12}$ without overlap between slit portions $PR_1$ and $PR_3$. The length LA obtained here is $L_A = 2\cdot LO = 300$ mm.

The central slit $\mathbf{34}B_{12}$ of length $L_B$ is the intermediate length slit that is achievable with tools $\mathbf{51}_1$ and $\mathbf{53}_1$. In this second setup configuration, tools $\mathbf{51}_1$ and $\mathbf{53}_1$ are mounted on their respective rotary tool-holder shafts at the second angular positions that make it possible to obtain the center slit $\mathbf{34}B_{12}$ with a partial overlap of LO/13 between slit portions $PR_1$ and $PR_3$. Length LB obtained here is $L_B = 2\cdot LO - LO/3 = 250$ mm.

The central slit $\mathbf{34}B_{12}$ of length $L_C$ is the minimum length slit that is achievable with tools $\mathbf{51}_1$ and $\mathbf{53}_1$. In this third setup configuration, tools $\mathbf{51}_1$ and $\mathbf{53}_1$ are mounted on their respective rotary tool-holder shafts at the third angular positions that make it possible to obtain the center slit $\mathbf{34}C_{12}$ with a partial overlap of LO between slit portions $PR_1$ and $PR_3$. The length $L_C$ obtained here is $L_C = LO = 150$ mm.

The unit for forming a plate element 2 according to the invention thus allows, with different angular settings of the same set of tools $\mathbf{51}_1$ and $\mathbf{53}_1$, the production of central slits $\mathbf{34}_{12}$ having a length L of between $2\cdot LO$ and LO, i.e., in the above example, a length L of between 150 mm and 300 mm.

Referring again more in particular to FIG. 3, the first unit for processing a plate element $\mathbf{20}_1$ also performs complementary first processing operations that are performed by tool devices associated with the third pair of rotating cylindrical shafts $\mathbf{202}_1$. These first complementary processing operations comprise cutting operations of the box tab $\mathbf{33}_2$ of layer P2 and pre-creasing operations for making pre-creasing 36 of the future folding lines in layers P1 and P2.

A cutting device $\mathbf{52}_1$, mounted on the tool shaft of the third pair of rotating cylindrical shafts $\mathbf{202}_1$, is provided to perform cutting operations of the box tab $\mathbf{33}_2$ on the proximal lateral edge 38 of the plate element. The cutting device $\mathbf{52}_1$ provides beveled cuts on the front and rear edges of the box tab $\mathbf{33}_2$, as visible on the preformed plate element $\mathbf{3}_{B0}$ in FIG. 3.

A pre-creasing device (not shown) is also mounted on the third pair of rotating cylindrical shafts $\mathbf{202}_1$. This pre-creasing device performs pre-creasing 36 on the plate element. In this way, the thickness of the plate element is partially crushed along continuous lines, in order to make the fold lines in layers P1 and P2. The pre-creasing is set with a creasing rate TR, to obtain a pre-creased board thickness $E_{PR} = TR\cdot E_N$, with $E_N$ being the nominal thickness of the board.

The second unit for processing a plate element $\mathbf{20}_2$ processes the plate element $\mathbf{3}_{B0}$ and outputs the formed plate element $\mathbf{3}_B$ visible in FIGS. 2 and 3. The second plate element processing unit $\mathbf{20}_2$ supplements the processing operations performed on the first plate element processing unit $\mathbf{20}_1$ with other processing operations to complete the forming of the plate element.

The second unit for processing a plate element $\mathbf{20}_2$ performs the front edge slits $\mathbf{34}_1$ and the back edge slits $\mathbf{34}_2$, as well as additional second processing operations.

The front edge slits $\mathbf{34}_1$ and the back edge slits $\mathbf{34}_2$ are cut by suitable tools $\mathbf{53}_2$ and $\mathbf{51}_2$, visible in FIG. 3, respectively, equipped with the fourth and second pairs of rotating cylindrical shafts $\mathbf{203}_2$ and $\mathbf{201}_2$ of the second unit for processing a plate element $\mathbf{20}_2$. The tools $\mathbf{53}_2$ and $\mathbf{51}_2$ are carried by rotating tool shafts (upper cylindrical shafts) of the fourth and second pairs of rotating cylindrical shafts $\mathbf{203}_2$ and $\mathbf{201}_2$ of the second unit for processing a plate element $\mathbf{20}_2$, respectively, and are similar to the tools $\mathbf{51}_1$ and $\mathbf{53}_1$, used for central slitting $\mathbf{34}_{12}$.

The tools $\mathbf{51}_2$ and $\mathbf{53}_2$ are arranged and mounted on their respective rotating tool shafts such that they can set a length of the front and rear edge slits $\mathbf{34}_1$ and $\mathbf{34}_2$ equal to half L/2 of the length L of the center slits $\mathbf{34}_{12}$. The length L/2 of the front and rear edge slits $\mathbf{34}_1$ and $\mathbf{34}_2$, between LO and LO/2 depending on the length of the center slits $\mathbf{34}_{12}$, is adjusted by changing the angular position of the tools $\mathbf{51}_2$ and $\mathbf{53}_2$, on their respective rotating tool shafts, so as to configure the unit 2 for different folding box sizes.

The second complementary processing operations comprise box flap cutting operations $\mathbf{33}_1$ of layer P1, final creasing operations to complete the fold line creases 36 in layers P1 and P2, a first box flap crushing operation, a second distal lateral edge crushing operation 39, and an edge cutting operation on a distal lateral edge 39 of the plate element. The second complementary processing operations utilize tool devices associated with the third pair of rotating cylindrical shafts $\mathbf{202}_2$ and the first pair of rotating cylindrical shafts $\mathbf{200}_2$ of the second unit for processing a plate element $\mathbf{20}_2$.

A cutting device $52_2$, mounted on the tool shaft of the third pair of rotating cylindrical shafts $202_2$, is provided to perform cutting operations of the box tab $33_1$ on the proximal lateral edge 38 of the plate element. The cutting device $52_2$ provides beveled cuts on the front and rear edges of the box tab $33_1$, as visible on the preformed plate element $3_B$ in FIG. 3.

A pre-creasing device (not shown) is also mounted on the third pair of rotating cylindrical shafts $202_2$. This final creasing device complements the pre-creasing operations performed in the first unit for processing a plate element $20_1$ to obtain a desired final value, for the creasing rate TR of the folding lines.

A first box tab crushing device (not shown) is mounted on the first pair of rotating cylindrical shafts $200_2$ of the second unit for processing a plate element $20_2$. This first box tab crushing device crushes the thickness of the proximal lateral strip of the plate element at the proximal lateral edge 38, the width of this proximal strip being substantially equal to the width of the box tabs $33_1$ and $33_2$. A second crushing device crushes the thickness of a distal lateral strip of the plate element at the distal lateral edge 39. Crushing this proximal strip and this distal strip makes it possible to obtain box tabs $33_1$ and $33_2$ and the opposite distal lateral edge 39 having a reduced thickness, in order to subsequently avoid an excess thickness in the folded assembly 4 (cf. FIG. 2), where the tabs are glued to the corresponding box flanks.

The edge cutting operation on the distal lateral edge 39 of the plate element is performed by an edge cutter (not shown) installed in the second unit for processing a plate element 202.

As visible in FIG. 3, the cutting unit 21 is located downstream of the second unit for processing a plate element $20_2$ for receiving the formed plate element $3_B$. The cutting unit 21 is typically a rotary cutter with rotating cylindrical shafts. The cutting unit 21 outputs the plate element $3_C$ incorporating the attachment points 37 between layers P1 and P2.

The unit for forming a plate element 2 according to this invention is designed with a modular approach. In fact, the unit for forming a plate element 2 is created by associating two similar units for processing a plate element which may be modular equipment from a package manufacturing line.

Figure 5:
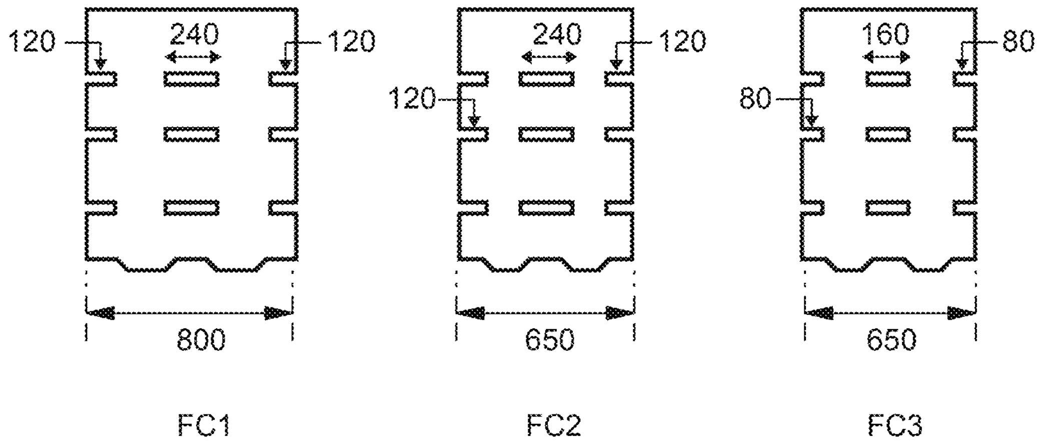
FIG. 5 is a diagram showing examples of plate elements that may be produced with the unit for forming a plate element of FIG. 3 to manufacture folding boxes of different sizes.

The unit for forming a plate element 2 according to this invention is designed to allow maximum flexibility in the manufacture of folding boxes of different sizes. By way of illustration, FIG. 5 shows three formed plate elements, FC1, FC2 and FC3, which may be produced with the unit for forming a plate element 2 and corresponding to folding boxes of different sizes.

The plate elements FC1 and FC2 have different widths, 800 mm and 650 mm respectively, but with slits of the same dimensions respectively, 240 mm and 120 mm for the center and edge slits.

The plate elements FC2 and FC3 have the same width of 650 mm, but with different slit sizes, FC3 having center and edge slits of 160 mm and 80 mm respectively.

The combination of the unit for forming a plate element 2 with the cutting unit 21 provides a plate element forming assembly capable of providing a plate element, with two layers and their attachment points, ready to be folded and glued to make two folding boxes.

The forming unit as well as the plate element forming assembly according to the invention make it possible to substantially increase the production rate of folding boxes compared to the prior art.

The invention is not limited to the particular embodiment which was described herein by way of example. The person skilled in the art, depending on the applications of the invention, will be able to make various modifications and variants falling within the scope of protection of the invention.

The invention claimed is:

1. A forming unit for continuous production of folding boxes from a plurality of plate elements, wherein the plurality of plate elements are successively inserted into the forming unit and move in a feed direction, the forming unit comprising:

a first slotter unit and a second slotter unit, each provided with pairs of rotating cylindrical shafts carrying respective forming tools which perform slitting, creasing, and cutting operations to form a plate element among the plurality of plate elements, and a cutting unit in which the pairs of rotating cylindrical shafts and the cutting unit work together to create, in the formed plate element, front and rear juxtaposed folding box layers, wherein a first two pairs of shafts among the pairs of rotating cylindrical shafts of the first slotter unit are configured to work together to provide central slits in each plate element aligned on a central transverse axis of the plate element, and a second two pairs of shafts, different from the first two pairs of shafts, among the pairs of rotating cylindrical shafts of the second slotter unit are configured to work together to respectively create rear edge slits in the rear layer and front edge slits in the front layer, wherein each pair of shafts of the first two pairs of shafts and of the second two pairs of shafts carries only one slitting tool fixed to a tool shaft of the corresponding pair of shafts wherein an angular position of a first tool shaft of one of the first two pairs of shafts and the second two pairs of shafts is adjustable automatically by a position variator, with respect to a second tool shaft of one of the first two pairs of shafts and the second two pairs of shafts, without adjusting an angular position of the slitting tool of the first tool shaft relative to the first tool shaft, to change a length of a central slit or a distance between a central slit and one of a rear edge slit and a front edge slit, and wherein the first slotter unit is arranged upstream of the second slotter unit in the feed direction and is configured to provide the central slits before the second slotter unit creates the rear edge slits and the front edge slits.

2. The forming unit according to claim 1, wherein the cutting unit comprises a perforation blade perpendicular to the feed direction, and which allows the front and rear juxtaposed folding box layers to be serially associated and connected to each other by attachment points.

3. The forming unit according to claim 1, further comprising:

a pair of shafts arranged to perform cutting operations of a box flap in the rear layer and pre-creasing operations for folding lines in the front and rear layers.

4. The forming unit according to claim 3, further comprising:

a pair of shafts arranged to perform cutting operations of a box flap in the front layer and creasing operations for the pre-creased folding lines in the front and rear layers, and a pair of shafts arranged to perform crushing operations on the front and rear layers.

5. The forming unit according to claim 1, wherein the cutting unit is a rotary cutter with rotating cylindrical shafts.

6. The forming unit according to claim 1, wherein the first slotter unit comprises a feeding pair of rotating cylindrical shafts dedicated to feeding the plurality of plate elements to a fed pair of rotating cylindrical slitting shafts.

7. The forming unit according to claim 1, wherein the front and rear juxtaposed folding box layers are attached together at attachment points.

* * * * *